United States Patent Office 3,220,958
Patented Nov. 30, 1965

3,220,958
CONVERSION CATALYST PREPARATION
George L. Hervert, Downers Grove, and Carl B. Linn, Riverside, Ill., assignors to Universal Oil Products Company, Des Plaines, Ill., a corporation of Delaware
No Drawing. Filed Sept. 12, 1960, Ser. No. 55,140
11 Claims. (Cl. 252—433)

This invention relates to catalysts for the conversion of organic compounds and more particularly to a catalyst which may be used for the selective alkylation of aromatic compounds. Still more particularly this invention relates to a method for the preparation of conversion catalysts which may be used to selectively alkylate aromatic hydrocarbons.

It is an object of this invention to provide a process for preparing a conversion catalyst which will selectively alkylate aromatic compounds, and particularly aromatic hydrocarbons, with an alkylating agent comprising a low molecular weight olefinic hydrocarbon.

A further object of this invention is to provide a catalyst which will selectively alkyalte an aromatic compound, and particularly an aromatic hydrocarbon such as benzene with propylene, to form cumene, said cumene being subsequently oxidized to form cumene hydroperoxide. Following this oxidation step, the cumene hydroperoxide may be readily decomposed into phenol and acetone which are then separated and recovered, said phenol and acetone being well-known raw materials which find a wide variety of uses in the chemical field as intermediates in the preparation of other compounds. In addition the catalyst which is manufactured according to the process of this invention may also be used to produce p-diisopropylbenzene which may be oxidized to form terephthalic acid, said terephthalic acid being used as a starting material for the production of synthetic fibers of the glycol-terephthalic acid. In addition the catalyst prepared according to the process of this invention may be used to separate an olefin mixture containing ethylene and higher molecular weight olefins such as propylene, the butylenes, etc., by subjecting an alkylatable aromatic hydrocarbon to the action of said olefinic mixture in the presence of the catalyst of this invention, the higher molecular weight olefins thereby reacting with the the aromatic hydrocarbon to the exclusion of the ethylene. The unreacted ethylene may then be separated and recovered from the reaction mixture in a substantially pure form, and further utilized in processes demanding a relatively pure ethylene feed.

One embodiment of this invention is found in a process for the preparation of a conversion catalyst which comprises contacting an alumina selected from the group consisting of gamma-alumina, eta-alumina and theta-alumina with a sulfur compound, and thereafter treating the resultant sulfur containing alumina with boron trifluoride to form the desired catalyst.

A further embodiment of this invention resides in a process for the preparation of a conversion catalyst which comprises contacting a substantially anhydrous alumina selected from the group consisting of gamma-alumina, eta-alumina and theta-alumina with a sulfur compound and thereafter treating the resultant sulfur containing alumina with from about 2% to about 50% by weight boron trifluoride based on the alumina at a temperature in the range of from about 25° to about 300° C. to form the desired catalyst.

Yet another embodiment of the invention is found in a process for the preparation of a conversion catalyst which comprises contacting a substantially anhydrous alumina selected from the group consisting of gamma-alumina, eta-alumina and theta-alumina with from about 0.01 to about 25% by weight of a sulfur compound based on the alumina and thereafter treating the resultant sulfur containing alumina with from about 2% to about 50% by weight boron trifluoride based on the alumina at a temperature in the range of from about 25° to about 300° C. to form the desired catalyst.

A specific embodiment of the invention resides in a process for the preparation of a conversion catalyst which comprises contacting substantially anhydrous gamma-alumina with from about 0.01 to about 25% by weight of thiophene based on the alumina and thereafter treating the resultant sulfur containing gamma-alumina with from about 2 to about 50% by weight of boron trifluoride based on the alumina at a temperature in the range of from about 25° to about 300° C. to form the desired catalyst.

Still another embodiment of the invention resides in a conversion catalyst comprising a boron trifluoride modified sulfur containing alumina compound.

Another specific embodiment of the invention is found in a conversion catalyst comprising a boron trifluoride modified substantially anhydrous gamma-alumina compoud containing from about 0.01 to about 25% by weight of thiophene based on the alumina.

Other objects and embodiments referring to alternative sulfur compounds will be found in the following further detailed description of the invention.

Previously, it has been suggested that boron trifluoride can be utilized as a catalyst for the alkylation of aromatic hydrocarbons with unsaturated hydrocarbons. For example, Hofmann and Wulff succeeded in replacing aluminum chloride by boron trifluoride for catalysis of condensation reactions of the Friedel-Crafts type (German Patent 513,414, British Patent 307,802, and French Patent 665,812). Aromatic hydrocarbons such as benzene, toluene, tetralin, and naphthalene have been condensed with ethylene, propylene, isononylenes, and cyclohexene in the presence of boron trifluoride with the production of the corresponding mono- and polyalkylated aromatic hydrocarbon derivatives. In these processes rather massive amounts of boron trifluoride have been utilized as the catalyst. Similarly, the olefin utilized has been pure or substantially pure. No successful processes have yet been introduced in which the olefin content of a gas stream, which is rather dilute in olefins, has been successfully consumed to completion in the absence of some olefin concentration step or steps. By the use of the process of the present invention, such gas streams may be utilized per se as alkylating agents along with minor amounts of boron trifluoride and substantially complete conversions of the olefin content having a higher molecular weight than ethylene are obtained, while the unreacted ethylene may be recovered.

In the preferred embodiment of this invention the substantially anhydrous gamma-, eta- or theta-alumina is first treated with a sulfur containing compound by contacting said alumina with a sulfur containing compound in an amount of from about 0.01% to about 25% by weight of the sulfur compound based on the alumina at a temperature ranging from about room temperature (25° C.) up to about 300° C. The alumina may, in one manner of operation, be placed as a fixed bed in a reaction zone and a sufficient quantity of the sulfur compound in either gaseous or liquid form passed therethrough to insure thorough impregnation, or if so desired the alumina may be admixed with a sulfur compound dissolved in a substantially inert organic solvent and the sulfur compound allowed to remain in contact with the alumina for a predetermined period of time ranging from about 4 to about 72 hours or more. The sulfur containing compound, examples of which include hydrogen sulfide, thiophene, o-thioxene, m-thioxene, thiophenol, methyl mercaptan, ethyl mercaptan, n-propyl mercaptan, isopropyl mercaptan, n-butyl mercaptan, the butyl mercaptans, the pentyl mercaptans, the hexyl mercaptans, the heptyl mercaptans, etc., may be utilized in the required amount per se or may be used in dilute form by being diluted with various other gases.

Boron trifluoride is a gas (B.P. —101° C., M.P. —126° C.) which is appreciably soluble in many organic solvents. It may be utilized per se by merely bubbling into a reaction mixture or it may be utilized as a solution of the gas in an organic solvent such as the aromatic hydrocarbon to be alkylated, for example, benzene. Such solutions are within the generally broad scope of the use of a boron trifluoride modified catalyst in the process of the present invention although not necessarily with equivalent results. Gaseous boron trifluoride is preferred.

The preferred catalyst composition, as stated hereinabove, comprises boron trifluoride and boron trifluoride modified substantially anhydrous alumina containing sulfur. Of the various types of alumina containing sulfur which may be successfully and satisfactorily modified with boron trifluoride, three crystalline structures of alumina have been found to be particularly suitable. These crystalline structures are substantialy anhydrous gamma-alumina, substantially anhydrous eta-alumina and substantially anhydrous theta-alumina. The exact reason for the specific utility of these three crystalline alumina modifications in the process of this invention is not fully understood but it is believed to be connected with the number of residual hydroxyl groups on the surface of these three particular crystalline alumina modifications. It has been established, for example, that other crystalline alumina modifications such as gamma-alumina trihydrate $$(Al_2O_3 \cdot 3H_2O)$$

or anhydrous alpha-alumina are less active and cannot be utilized in the process of this invention in the same manner as substantially anhydrous gamma-alumina, substantially anhydrous eta-alumina and substantially anhydrous theta-alumina are used whenever complete olefin consumption is required. Modification of sulfur containing aluminas with boron trifluoride may be carried out prior to the addition of the alumina to the alkylation reaction zone or this modification may be carried out in situ. Furthermore, this modification of the alumina with boron trifluoride may be carried out prior to contact of these boron trifluoride modified aluminas with the aromatic hydrocarbon to be alkylated and the olefin-acting compound, or the modification may be carried out in the presence of the aromatic hydrocarbon to be alkylated, or in the presence of both the aromatic hydrocarbon to be alkylated and the olefin-acting compound. Obviously there is some limitation upon this last mentioned method of alumina modification. The modification of the above mentioned aluminas with boron trifluoride is an exothermic reaction and care must be taken to provide for proper removal of the resultant heat. The modification of the alumina is carried out by contacting the alumina with from about 2% to about 50% by weight boron trifluoride based on the alumina. In one manner of operation, the sulfur containing alumina is placed as a fixed bed in a reaction zone, which may be the alkylation reaction zone, and the desired quantity of boron trifluoride is passed therethrough. In such a case, the boron trifluoride may be utilized in so-called massive amounts or may be used in dilute form diluted with various other gases such as hydrogen, nitrogen, helium, etc. This contacting is normally carried out at temperatures ranging from room temperature (25° C.) up to that to be utilized for the alkylation reaction, that is, temperatures up to about 300° C. may be used. With the preselected sulfur containing alumina at room temperature, utilizing boron trifluoride alone, a temperature wave will travel through the alumina bed during this modification of the alumina with boron trifluoride, increasing the temperature of the alumina from room temperature up to about 150° C. or more. As the boron trifluoride content of the gases to be passed over the alumina is diminished, this temperature increase also diminishes and can be controlled more readily in such instances. In another method for the modification of the above mentioned sulfur containing gamma-, eta- and theta-aluminas with boron trifluoride, said alumina may be placed as a fixed bed in the alkylation reaction zone, the boron trifluoride dissolved in the aromatic hydrocarbon to be alkylated, and the solution of aromatic hydrocarbon and boron trifluoride passed over the alumina at the desired temperature until sufficient boron trifluoride has modified the alumina. When the gas phase treatment of the alumina is carried out, it is noted that no boron trifluoride passes through the alumina bed until all of the alumina has been modified by the boron trifluoride. This same phenomenon is observed during the modification of the alumina with the aromatic hydrocarbon solutions containing boron trifluoride. In another method, the modification of the sulfur containing alumina can be accomplished by utilization of a mixture of aromatic hydrocarbon to be alkylated, olefin-acting compound, and boron trifluoride which upon passage over the alumina forms the desired boron trifluoride modified sulfur containing alumina in situ. In the latter case, of course, the activity of the system is low initially and increases as the complete modification of the alumina with the boron trifluoride takes place. The exact manner by which the boron trifluoride modifies the sulfur containing alumina is not understood. It may be that the modification is a result of complexing of the boron trifluoride with the alumina, or on the other hand, it may be that the boron trifluoride reacts with residual hydroxyl groups on the alumina surface. It has been found at any particular preselected temperature for treatment of substantially anhydrous sulfur containing alumina, utilizing either the gamma-, eta- or theta-alumina modifications as set forth hereinabove, that the fluorine content of the treated aluminas attains a maximum which is not increased by further passage of boron trifluoride over the same. This maximum fluorine or boron trifluoride content of the alumina increases with temperature and depends upon the specific alumina selected. As stated hereinabove, the alumina treatment is, in the preferred embodiment, carried out at a temperature equal to or just greater than the selected reaction temperature so that the alumina will not necessarily tend to be modified further by the boron trifluoride which may be added in amounts not more than 0.8 gram per gram mol of olefin-acting compound during the process and so that control of the aromatic hydrocarbon alkylation reaction is attained more readily. In any case, the alumina resulting from any of the above mentioned boron trifluoride treatments is referred to herein in the specification and claims as boron trifluoride modified substantially anhydrous sulfur containing alumina.

It is also contemplated within the scope of this invention that the alumina, either gamma-, eta- or theta- in character, may be modified with boron trifluoride in one of the methods hereinbefore set forth, and the resultant boron trifluoride, substantially anhydrous alumina is then treated with a sulfur containing compound of the type hereinabove mentioned in any manner known in the art to produce the desired catalyst.

As set forth hereinabove, the present invention relates to a process for the alkylation of an alkylatable aromatic hydrocarbon with an olefin-acting compound in the presence of a catalyst comprising a boron trifluoride modified substantially anhydrous sulfur containing inorganic oxide, and particularly in the presence of a catalyst comprising not more than 0.8 gram of boron trifluoride per gram mol of olefin-acting compound and a boron trifluoride modified substantially anhydrous sulfur containing gamma-, eta- or theta-alumina. Many aromatic hydrocarbons are utilizable as starting materials in the process of this invention. Preferred aromatic hydrocarbons are monocyclic aromatic hydrocarbons, that is, benzene hydrocarbons. Suitable aromatic hydrocarbons include benzene, toluene, ortho-xylene, meta-xylene, para-xylene, ethylbenzene, ortho-ethyltoluene, meta-ethyltoluene, para-ethyltoluene, 1,2,3-trimethylbenzene, 1,2,4-trimethylbenzene, 1,3,5-trimethylbenzene or mesitylene, normal propylbenzene, isopropylbenzene, etc. Higher molecular weight alkylaromatic hydrocarbons are also suitable as starting materials and include aromatic hydrocarbons such as are produced by the alkylation of aromatic hydrocarbons with olefin polymers. Such products are frequently referred to in the art as alkylate, and include hexylbenzene, nonylbenzene, dodecyltoluene, pentadecyltoluene, etc. Very often alkylate is obtained as a high boiling fraction in which the alkyl group attached to the aromatic nucleus varies in size from about $C_9$ to about $C_{18}$. Other suitable alkylatable aromatic hydrocarbons include those with two or more aryl groups such as diphenyl, diphenylmethane, triphenyl, triphenylmethane, fluorene, stilbene, etc. Examples of other alkylatable aromatic hypdrocarbons within the scope of this invention as starting materials containing condensed benzene rings include naphthalene, alpha - methylnaphthalene, beta - methylnaphthalene, anthracene, phenanthrene, naphthacene, rubrene, etc. Of the above alkylatable aromatic hydrocarbons for use as starting materials in the process of this invention, the benzene hydrocarbons are preferred, and of the preferred benzene hydrocarbons, benzene itself is particularly preferred.

Suitable olefin-acting compounds or alkylating agents which may be charged in the process of this invention include monoolefins, diolefins, polyolefins, acetylenic hydrocarbons, and also alkyl chlorides, alkyl bromides, and alkyl iodides. The preferred olefin-acting compounds are olefinic hydrocarbons which comprise monoolefins having one double bond per molecule and polyolefins which have more than one double bond per molecule. Monoolefins which may be utilized as olefin-acting compounds or alkylating agents for alkylating alkylatable aromatic hydrocarbons in the presence of the hereinabove described catalyst are either normally gaseous or normally liquid and include propylene, 1-butene, 2-butene, isobutylene, and higher normally liquid olefins such as pentenes, hexenes, heptenes, octenes, and higher molecular weight liquid olefins, the latter including various olefin polymers having from about 6 to about 18 carbon atoms per molecule such as propylene trimer, propylene tetramer, propylene pentamer, isobutylene dimer, isobutylene trimer, isobutylene tetramer, etc. Cycloolefins such as cyclopentene, methylcyclopentene, cyclohexene, methylcyclohexene, may be utilized, but generally not under the same conditions of operation applying to non-cyclic olefins. The polyolefinic hydrocarbons utilizable in the process of this invention include conjugated diolefins such as butadiene and isoprene, as well as non-conjugated diolefins and other polyolefinic hydrocarbons containing two or more double bonds per molecule. Acetylene and homologs thereof are also useful olefin-acting compounds.

As stated hereinabove, alkylation of the above alkylatable aromatic hydrocarbons may also be effected in the presence of the hereinabove referred to catalyst by reacting aromatic hydrocarbons with certain substances capable of producing olefinic hydrocarbons, or intermediates thereof, under the conditions of operation chosen for the process. Typical olefin producing substances capable of use include alkyl chlorides, alkyl bromides, and alkyl iodides capable of undergoing dehydrohalogenation to form olefinic hydrocarbons and thus containing at least two carbon atoms per molecule. Examples of such alkyl halides include normal propyl chloride, isopropyl chloride, normal butyl chloride, isobutyl chloride, secondary butyl chloride, tertiary butyl chloride, amyl chlorides, hexyl chlorides, etc., normal propyl bromide, isopropyl bromide, normal butyl bromide, isobutyl bromide, secondary butyl bromide, tertiary butyl bromide, amyl bromides, hexyl bromides, etc., ethyl iodide, normal propyl iodide, etc.

As stated hereinabove, olefin hydrocarbons, especially normally gaseous olefin hydrocarbons, are particularly preferred olefin-acting compounds or alkylating agents for use in the process of the present invention. As stated, the process can be successfully applied to and utilized for conversion of olefin hydrocarbons when these olefin hydrocarbons are present in minor quantities in gas streams. Thus, in contrast to prior art processes, the normally gaseous olefin hydrocarbon for use in the process of the present invention, need not be purified or concentrated. Such normally gaseous olefin hydrocarbons appear in minor concentrations in various refinery gas streams, usually diluted with various unreactive gases such as hydrogen, nitrogen, methane, ethane, propane, etc. These gas streams containing minor quantities of olefin hydrocarbon are obtained in petroleum refineries from various refinery installations including thermal cracking units, catalytic cracking units, thermal reforming units, coking units, polymerization units, etc. Such refinery gas streams have in the past often been burned for fuel value since an economical process for their utilization as alkylating agents or olefin-acting compounds has not been available except where concentrating of the olefin hydrocarbons has been carried out concurrently therewith. This is particularly true for refinery gas streams containing relatively minor quantities of olefin hydrocarbons such as ethylene and propylene. Therefore, the process of this invention utilizing the novel catalyst may be used to remove propylene from such a refinery gas stream by alkylating an aromatic hydrocarbon with the propylene or butylene without affecting the ethylene. These refinery gas streams containing minor quantities of olefin hydrocarbons such as ethylene, propylene, and the various butenes, depending upon their source, they contain varying quantities of nitrogen, hydrogen, and various normally gaseous olefinic hydrocarbons. Thus, a refinery off-gas ethylene stream may contain varying quantities of hydrogen, nitrogen, methane, and ethane with the ethylene in minor proportion, while a refinery off-gas propylene stream is normally diluted with propane and contains the propylene in minor quantities, and a refinery off-gas butene stream is normally diluted with butanes and contains the butenes in minor quantities. A typical analysis in mol percent for a utilizable refinery off-gas from a catalytic cracking unit is as follows: nitrogen, 4.0%; carbon monoxide, 0.2%; hydrogen, 5.4%; methane, 37.8%; ethylene, 10.3%; ethane, 24.7%; propylene, 6.4%; propane, 10.7%; and $C_4$ hydrocarbons, 0.5%. It is readily observed that the total olefin content of this gas stream is 16.7%. Such gas streams containing olefin hydrocarbons in minor or dilute quantities are particularly preferred alkylating agents or olefin-acting compounds within the broad scope of the present invention, the propylenes, butenes, etc., reacting with the aromatic hydrocarbons, while the ethylene is unreacted and may be recovered. Only the olefins in such gas streams undergo reaction in the process of this invention, and the remaining gases are vented from the process.

In accordance with the process of the present invention, the alkylation of alkylatable aromatic hydrocarbons with olefin-acting compounds react to produce alkylated aromatic hydrocarbons of higher molecular weight than those charged to the process is effected in the presence of the above indicated catalyst at a temperature of from about 0° C. or lower to about 300° C. or higher, and preferably from about 20° to about 230° C., although the exact temperature needed for a particular aromatic hydrocarbon alkylation reaction will depend upon the alkylatable aromatic hydrocarbon and olefin-acting compound employed. The alkylation reaction is usually carried out at a pressure of from about substantially atmospheric to about 200 atmospheres. The pressure utilized is usually selected to maintain the alkylatable aromatic hydrocarbon in substantially liquid phase. Within the above temperature and pressure ranges, it is not always possible to maintain the olefin-acting compound in liquid phase. Thus, when utilizing a refinery off-gas containing minor quantities of propylene, the propylene will be dissolved in the liquid phase alkylatable aromatic hydrocarbon to the extent governed by temperature, pressure, and solubility considerations. However, a portion thereof undoubtedly will be in the gas phase. When possible, it is preferred to maintain all of the reactants in liquid phase. Such is not always possible, however, as set forth hereinabove. Referring to the aromatic hydrocarbon subjected to alkylation, it is preferable to have present from 2 to 10 or more, sometimes up to 20, molecular proportions of alkylatable aromatic hydrocarbon per one molecular proportion of ole-fin acting compound introduced therewith to the alkylation zone. The higher molecular ratios of alkylatable aromatic hydrocarbon to olefin are particularly necessary when the olefin employed in the alkylation process is a high molecular weight olefin boiling generally higher than pentenes, since these olefins frequently undergo depolymerization prior to or substantially simultaneously with alkylation so that one molecular proportion of such an olefin can thus alkylate two or more molecular proportions of the alkylatable aromatic hydrocarbon. The higher molecular ratios of alkylatable aromatic hydrocarbon to olefin also tend to reduce the formation of polyalkylated products because of the operation of the law of mass action under these conditions.

In converting aromatic hydrocarbons to effect alkylation thereof with the type of catalysts herein described, either batch or continuous operations may be employed. The actual operation of the process admits of some modification depending upon the normal phase of the reacting constituents, whether the catalyst utilized is not more than 0.8 gram of boron trifluoride per gram mol of olefin-acting compound along with a boron trifluoride modified sulfur containing gamma-, eta- or theta-alumina, or said boron trifluoride modified sulfur containing alumina alone, and whether batch or continuous operations are employed. In one type of batch operation, an aromatic hydrocarbon to be alkylated, for example, benzene, is brought to a temperature and pressure within the approximate range specified in the presence of a catalyst comprising boron trifluoride and boron trifluoride modified substantially anhydrous sulfur containing gamma-alumina having a concentration corresponding to a sufficiently high activity and alkylation of the benzene is effected by the gradual introduction under pressure of an olefin such as propylene, butene or admixtures thereof, in a manner to attain contact of the catalyst and reactants and in a quantity so that the amount of boron trifluoride utilized is from about 0.001 gram to about 0.8 gram per gram mol of olefin. After a sufficient time at the desired temperature and pressure, the gases, if any, are vented and the alkylated aromatic hydrocarbon separated from the reaction products.

In another manner of operation, the aromatic hydrocarbon may be mixed with the olefin at a suitable temperature in the presence of sufficient boron trifluoride modified sulfur containing gamma-, eta- or theta-alumina, and boron trifluoride modified sulfur containing alumina, and boron trifluoride is then added to attain an amount between from about 0.001 gram to about 0.8 gram per gram mol of olefin. Then, reaction is induced by sufficiently long contact time with the catalyst. Alkylation may be allowed to progress to different stages depending upon contact time. In the case of the alkylation of benzene with normally gaseous olefins, the most desirable product is that obtained by the utilization in the process molar quantities of benzene exceeding those of the olefin. In a batch type of operation, the amount of boron trifluoride modified sulfur containing alumina utilized will range from about 1% to about 50% by weight based on the aromatic hydrocarbon. With this quantity of boron trifluoride modified sulfur containing alumina, and boron trifluoride as set forth hereinabove, the contact time may be varied from about 0.1 to about 25 hours or more.

Contact time is not only dependent upon the quantity of catalyst utilized but also upon the efficiency of mixing, shorter contact times being attained by increasing mixing. After batch treatment, the boron trifluoride component of the catalyst is removed in any suitable manner, such as by venting or caustic washing, the organic layer or fraction is decanted or filtered from the boron trifluoride modified sulfur containing alumina, and the organic product or fraction is then subjected to separation such as by fractionation for the recovery of the desired reaction product or products.

In one type of continuous operation, a liquid aromatic hydrocarbon, such as benzene, containing dissolved therein the requisite amount of boron trifluoride, may be pumped through a reactor containing a bed of solid boron trifluoride modified sulfur containing gamma-, eta- or theta-alumina. The olefin-acting compound may be added to the aromatic hydrocarbon stream prior to contact of this stream with the solid alumina bed, or it may be introduced at various points in the alumina bed, and it may be introduced continuously or intermittently, as set forth above. In this type of an operation, the hourly liquid space velocity of the aromatic hydrocarbon reactant will vary from about 0.25 to about 20 or more. The details of continuous processes of this general character are familiar to those skilled in the alkylation of aromatic hydrocarbons art and any necessary additions or modifications of the above general procedures will be more or less obvious and can be made without departing from the broad scope of this invention.

The following examples are given to illustrate the process of the present invention which, however, are not intended to limit the generally broad scope of the present invention in strict accordance therewith.

*Example I*

A catalyst of the type hereinbefore set forth in the preceding specification was prepared by submerging 200 g. of gamma-alumina in a solution consisting of 450 cc. of benzene and 50 cc. of thiophene for a period of about 64 hours. At the end of this time the benzene-thiophene solution was filtered off and the sulfur modified gamma-alumina was recovered and dried. Upon analysis the sulfur modified alumina was found to contain 11.9% thiophene (4.39% sulfur). The dried catalyst (60 cc.) was then placed in a reactor and treated with 7.0 g. of boron trifluoride. Upon completion if the preparation the catalyst was utilized as an alkylation catalyst in which benzene was treated with an alkylating agent comprising an ethylene-propylene mixture, the resulting reaction product comprising cumene (diisopropylbenzene).

*Example II*

In this example 200 g. of gamma-alumina is submerged in a solution consisting of 450 cc. of benzene and 50 cc. of o-thioxene for a period of 64 hours. At the end of this time the benzene-thioxene solution is filtered off and the sulfur-alumina is recovered and dried. Following this the sulfur modified alumina is treated with boron trifluoride and utilized as an alkylation catalyst.

*Example III*

Yet another alkylation catalyst is prepared by submerging 200 g. of theta-alumina in a solution consisting of 450 cc. of benzene and 50 cc. of ethyl mercaptan (ethylthiol) for a period of about 64 hours. At the end of this time the benzene-ethylthiol solution is filtered off and the sulfur-modified alumina is recovered, dried and treated with boron trifluoride.

Example IV

In this example an alkylation catalyst is prepared by submerging 200 g. of eta-alumina in a solution consisting of 450 cc. of benzene and 50 cc. of methyl mercaptan (methylthiol) for a period of about 64 hours. At the end of this time the benzene-methylthiol solution is dried and treated with boron trifluoride to prepare the desired catalyst.

We claim as our invention:

1. A process for the preparation of a conversion catalyst which comprises contacting a base consisting of an alumina selected from the group consisting of gamma-alumina, eta-alumina and theta-alumina with from about 0.01 to about 25% by weight of an organic compound consisting essentially of carbon, hydrogen and sulfur in which there is a carbon to sulfur bond based on the alumina at a temperature in the range of from about 25° to about 300° C. and thereafter treating the resultant sulfur containing alumina with from about 2% to about 50% by weight boron trifluoride based on the alumina at a temperature in the range of from about 25° to about 300° C. to form the desired catalyst.

2. A process for the preparation of a conversion catalyst which comprises contacting a base consisting of an anhydrous gamma-alumina with from about 0.01 to about 25% by weight of an organic compound consisting essentially of carbon, hydrogen and sulfur in which there is a carbon to sulfur bond based on the alumina at a temperature in the range of from about 25° to about 300° C. and thereafter treating the resultant sulfur containing alumina with from about 2% to about 50% by weight boron trifluoride based on the alumina at a temperature in the range of from about 25° to about 300° C., to form the desired catalyst.

3. A process for the preparation of a conversion catalyst which comprises contacting a base consisting of an anhydrous theta-alumina with from about 0.01 to about 25% by weight of an organic compound consisting essentially of carbon, hydrogen and sulfur in which there is a carbon to sulfur bond based on the alumina at a temperature in the range of from about 25° to amout 300° C. and thereafter treating the resultant sulfur containing alumina with from about 2% to about 50% by weight boron trifluoride based on the alumina at a temperature in the range of from about 25° to about 300° C. to form the desired catalyst.

4. A process for the preparation of a conversion catalyst which comprises contacting base consisting of an anhydrous alumina selected from the group consisting of gamma-alumina, eta-alumina and theta-alumina with from about 0.01 to about 25% by weight of an organic compound consisting essentially of carbon, hydrogen and sulfur in which there is a carbon to sulfur bond based on the alumina at a temperature in the range of from about 25° to about 300° C. and thereafter treating the resultant sulfur containing alumina with from about 2% to about 50% by weight boron trifluoride based on the alumina at a temperature in the range of from about 25° to about 300° C. to form the desired catalyst.

5. A process for the preparation of a conversion catalyst which comprises contacting a base consisting of an anhydrous alumina selected from the group consisting of gamma-alumina, eta-alumina and theta-alumina with from about 0.01 to about 25% by weight of thiophene based on the alumina at a temperaturt in the range of from about 25° to about 300° C. and thereafter treating the resultant sulfur containing alumina with from about 2% to about 50% by weight boron trifluoride based on the alumina at a temperature in the range of from about 25° to about 300° C. to form the desired catalyst.

6. A process for the preparation of a conversion catalyst which comprises contacting a base consisting of an anhydrous alumina selected from the group consisting of gamma-alumina, eta-alumina and theta-alumina with from about 0.01 to about 25% by weight of ethyl mercaptan based on the alumina at a temperature in the range of from about 25° to about 300° C. and thereafter treating the resultant sulfur containing alumina with from about 2% to about 50% by weight boron trifluoride based on the alumina at a temperature in the range of from about 25° to about 300° C. to form the desired catalyst.

7. A process for the preparation of a conversion catalyst which comprises contacting a base consisting of an anhydrous gamma-alumina with from about 0.01 to about 25% by weight of thiophene based on the alumina at a temperature in the range of from about 25° to about 300° C. and thereafter treating the resultant sulfur containing gamma-alumina with from about 2 to about 50% by weight of boron trifluoride based on the alumina at a temperature in the range of from about 25° to about 300° C. to form the desired catalyst.

8. A process for the preparation of a conversion catalyst which comprises contacting a base consisting of an anhydrous theta-alumina with from about 0.01 to about 25% by weight of ethyl mercaptan based on the alumina at a temperature in the range of from about 25° to about 300° C. and thereafter treating the resultant sulfur containing theta-alumina with from about 2 to about 50% by weight of boron trifluoride based on the alumina at a temperature in the range of from about 25° to about 300° C. to form the desired catalyst.

9. A process for the preparation of a conversion catalyst which comprises contacting a base consisting of an anhydrous eta-alumina with from about 0.01 to about 25% by weight of ethyl mercaptan based on the alumina at a temperature in the range of from about 25° to about 300° C. and thereafter treating the resultant sulfur containing eta-alumina with from about 2 to about 50% by weight of boron trifluoride based on the alumina at a temperature in the range of from about 25° to about 300 C. to form the desired catalyst.

10. The process of claim 1 further characterized in that said sulfur compound is selected from the group consisting of thiophene, o-thioxene, m-thioxene, thiophenal and alkyl mercaptans.

11. The process of claim 1 further characterized in that said sulfur compound is an alkyl mercaptan.

References Cited by the Examiner

UNITED STATES PATENTS

| | | | |
|---|---|---|---|
| 2,623,007 | 12/1952 | Myers | 252—439 |
| 2,748,090 | 5/1956 | Watkins | 252—433 |
| 2,945,057 | 7/1960 | McDaniel et al. | 252—463 X |
| 3,086,998 | 4/1963 | Hervert et al. | 252—433 X |
| 3,128,243 | 4/1964 | Yamamoto | 252—433 X |

OTHER REFERENCES

Russell: "Alumina Properties," Technical Paper No. 10, pages 17, 26, 1953, published by Alumina Co. of America.

MAURICE A. BRINDISI, *Primary Examiner.*

JULIUS GREENWALD, *Examiner.*